(12) United States Patent
Luo et al.

(10) Patent No.: US 8,401,029 B2
(45) Date of Patent: Mar. 19, 2013

(54) METHOD, DEVICE AND SYSTEM FOR ESTABLISHING A BEARER FOR A GSM NETWORK

(75) Inventors: Shaohua Luo, Shenzhen (CN); Zhenhua Liu, Shenzhen (CN); Hao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 12/533,583

(22) Filed: Jul. 31, 2009

(65) Prior Publication Data

US 2009/0290542 A1     Nov. 26, 2009

Related U.S. Application Data

(63) Continuation of application No. PCT/CN2008/070249, filed on Feb. 2, 2008.

(30) Foreign Application Priority Data

Feb. 2, 2007   (CN) .......................... 2007 1 0006885
Jun. 1, 2007   (CN) .......................... 2007 1 0105889

(51) Int. Cl.
     *H04L 12/28*     (2006.01)
(52) U.S. Cl. ........ 370/401; 370/400; 370/402; 370/403; 370/405
(58) Field of Classification Search .................. 370/401, 370/400, 402
     See application file for complete search history.

(56) References Cited

U.S. PATENT DOCUMENTS

| | | |
|---|---|---|
| 2004/0005886 A1 | 1/2004 | Oda et al. |
| 2010/0017468 A1* | 1/2010 | Forstadius ................. 709/203 |

FOREIGN PATENT DOCUMENTS

| | | |
|---|---|---|
| CN | 1835605 | 9/2006 |
| CN | 1835605 A | 9/2006 |
| CN | 1870772 | 11/2006 |
| CN | 1870772 A | 11/2006 |
| WO | 2005/112410 A2 | 11/2005 |
| WO | WO-2005/112410 | 11/2005 |

OTHER PUBLICATIONS

"3rd General Partnership Project: Technical Specification Group Core Network; Digital cellular telecommunications system (Phase 2+); Rate adaption on the Base Station System—Mobile Services Switching Centre (BSS—MSC) interface (Release 1999)" Global System for Mobile Communications. 3GPP TS 08.20, V8.3.0 (Mar. 2001). 25 pages.

(Continued)

*Primary Examiner* — Brandon Renner
*Assistant Examiner* — Abdelnabi Musa
(74) *Attorney, Agent, or Firm* — Brinks Hofer Gilson & Lione

(57) ABSTRACT

A method for establishing a bearer for a GSM network is disclosed in embodiments of the present invention. The method includes: receiving, by a Media Gateway, a message for adding a wireless side end point, assigning an IP address and a port number for a call and transmitting a response message containing the IP address and the port number assigned for the call; acquiring, by the Media Gateway, the IP address and the port number assigned for the call by the Base Station Controller via the Mobile Switching Center Server and establishing an IP bearer with the Base Station Controller. A device and a system for establishing a bearer for a GSM network are also disclosed in embodiments of the present invention. With the present invention, a full or part path transcoder-free operation may be realized, which can avoid quality reduction and transmission delay.

8 Claims, 10 Drawing Sheets

OTHER PUBLICATIONS

"3$^{rd}$ Generation Partnership Project: Technical Specification Group GSM/EDGE Radio Access Network; Digital cellular telecommunications system (Phase 2+); Inband control of remote transcoders and rate adaptors for Enhanced Full Rate (EFR) and full rate traffic channels (Release 1999)" Global System for Mobile Communications. 3GPP TS 08.60, V8.2.1 (Jan. 2003). 39 pages.

"3$^{rd}$ Generation Partnership Project: Technical Specification Group GSM/EDGE Radio Access Network; Digital cellular telecommunications system (Phase 2+); In-band control of remote transcoders and rate adaptors for half rate traffic channels (Release 1999)" Global System for Mobile Communications. 3GPP TS 08.61, V8.1.0 (Feb. 2002). 41 pages.

"3$^{rd}$ General Partnership Project: Technical Specification Group Core Network; Bearer-independent circuit-switched core network; Stage 2 (Release 4)" 3GPP TS 23.205, V4.8.0 (Mar. 2005). 182 pages.

Office Action issued in corresponding Russian Patent Application No. RU2009132931, mailed Dec. 8, 2010.

Fu, Jihua: "ZTE's Flexible CDMA2000 All-IP Networking Solution" World Telecommunications, May 2006, 2006, No. 5, pp. 61-63 ISSN:1001-4802.0.2006-05-020.

Supplementary European Search Report issued in corresponding European Patent Application No. 08 70 6625; issued Sep. 2, 2010.

Written Opinion of the International Searching Authority issued in corresponding PCT Patent Application No. PCT/CN2008/070249, mailed May 22, 2008.

Office Action issued in corresponding Chinese Patent Application No. 200710006885.6, mailed Apr. 28, 2011.

* cited by examiner

User plane protocol stack of Nb interface

User plane protocol stack of Nb interface

METHOD, DEVICE AND SYSTEM FOR ESTABLISHING A BEARER FOR A GSM NETWORK

CROSS REFERENCE TO RELATED APPLICATIONS

This application is a continuation of International Patent Application No. PCT/CN2008/070249 filed on Feb. 2, 2008 which claims priority to Chinese Patent Application Nos. 200710006885.6 filed Feb. 2, 2007, and 200710105889.X filed Jun. 1, 2007, all of which are incorporated by reference herein their entireties.

FIELD OF THE INVENTION

The present invention relates to GSM network interface technology, particularly to a method, a device and a system for establishing a bearer for a GSM network.

BACKGROUND

In a conventional Global System for Mobile Communication (GSM) network system, the Base Station Controller (BSC) side is required to convert the wireless side voice from compressed codes (such as HR/FR/EFR codes) to non-compressed G.711 codes. The Media Gateway (MGW) on the core network side is required to convert the non-compressed G.711 codes to Adaptive Multi-Rate (AMR) compressed codes. Furthermore, the MGW is required to convert the bearer mode between TDM bearer on one side and IP bearer on the other side. In order to realize these conversions, a Transcoder and Rate Adaption Unit (TRAU) or a TransCoder (TC) is typically inserted in the BSC of the GSM network system, and a TC is inserted in the MGW, for corresponding conversions of voice codes and bearer modes. Such conversions may lower voice quality, waste a lot of costly TC resources, and increase equipment costs. At the same time, since G.711 coding is used in the A interface, each path of the calls occupies a bandwidth of 64 k, causing a waste of long-distance transmission resources from the BSC to the MGW.

To save the TDM transmission resource between the BSC and the MGW, an improved method presently proposed is to move the TRAU from the BSC side to the MGW side to collocate the TRAU with the MGW, and an Ater interface is provided between the BSC and the TRAU for transmitting voice and data in format of TRAU frames. Since each call of the Ater interface occupies a bandwidth of only 16 k, four calls may be multiplexed into one TDM slot, saving the valuable long-distance transmission resource between the BSC and the MGW.

Although the improved method mentioned above solves the problem of wasting the long-distance transmission resource between the BSC and the MGW, TCs are still required to be inserted in both the TRAU and the MGW for the conversion of bearer modes, which also suffers voice quality deterioration and TC resource wasting due to multiple code conversions.

SUMMARY

An embodiment of the present invention provides a method for establishing a bearer for a GSM network to improve voice quality.

Another embodiment of the present invention provides a base station control device to improve voice quality.

Another embodiment of the present invention further provides a Media Gateway device to improve voice quality.

Another embodiment of the present invention further provides a Mobile Switching Center server to improve voice quality.

Another embodiment of the present invention further provides a system for establishing a bearer for a GSM network to improve voice quality.

To achieve the above-mentioned objects, the technical solutions according to embodiments of the present invention are specifically implemented as follows.

A method for establishing a bearer for a GSM network includes the following steps:

receiving, by a Media Gateway, a message for adding a wireless side end point, assigning an IP address and a port number for a call, and transmitting a response message containing the IP address and the port number assigned for the call; and acquiring, by the Media Gateway, the IP address and the port number assigned for the call by a wireless side Base Station Subsystem, and establishing an IP bearer with the wireless side Base Station Subsystem.

A base station control device includes:

a receiving unit, configured to receive an assignment message and transmit it to a processing unit;

a processing unit, configured to receive the assignment message, acquire the IP address and the port number of the Media Gateway contained in the message, assign the IP address and the port number for a call, initiate the establishment of an IP bearer, and transmit an assignment response message containing the IP address and the port number assigned for the call by the equipment to a transmitting unit; and a transmitting unit, configured to receive and transmit the assignment response message.

A Media Gateway includes:

a receiving unit, configured to receive a message for adding a wireless side end point and a bearer and code type modify message, and transmit them to a processing unit;

a processing unit, configured to receive the message for adding a wireless side end point, assign an IP address and a port number for a call, output a response message containing the IP address and the port number assigned for the call to a transmitting unit; receive the bearer and code type modify message, acquire information about the IP address and the port number assigned for the call by the wireless side Base Station Subsystem contained in the message, and establish IP bearer with the wireless side Base Station Subsystem; and a transmitting unit, configured to receive and transmit the response message.

A Mobile Switching Center Server includes:

a receiving unit, configured to receive a call request containing information about the code types supported by a mobile station itself transmitted by the mobile station, a response message containing the IP address and the port number assigned for the call returned by the Media Gateway and an assignment response message returned by the wireless side Base Station Subsystem, and transmit them to the processing unit;

a processing unit, configured to establish a priority list of the code type according to the call request message, transmit a message for adding a wireless side end point to the transmitting unit; generate an assignment message according to the received response message and the priority list of the code type, and output the assignment message to the transmitting unit; conduct code type negotiation according to the received assignment response message, and output information containing the IP address and the port number assigned to the call by the wireless side Base Station Subsystem to the transmitting unit; and a transmitting unit, configured to receive and transmit to the Media Gateway the message for adding a wireless side end point and the information containing the IP address and the port number assigned for the call by the Base Station Controller output by the processing unit; receive the assignment message output by the processing unit, and transmit it to the wireless side Base Station Subsystem.

A system for establishing a bearer for a GSM network includes a Base Station Controller, a Mobile Switching Center Server and a Media Gateway. The Mobile Switching Center Server is further configured to implement IP-based interfaces between the Base Station Controller and the Media Gateway, wherein:

the Mobile Switching Center Server is configured to receive a call request message containing information about code types supported by the mobile station itself, transmit a message for adding a wireless side end point to the Media Gateway, receive the response message containing the IP address and the port number assigned for the call returned by the Media Gateway, transmit the assignment message to the Base Station Controller; receive the assignment response message returned by the Base Station Controller, conduct code type negotiation, and transmit the information containing the IP address and the port number assigned for the call by the Base Station Controller to the Media Gateway;

the Media Gateway is configured to receive the message for adding a wireless side end point transmitted by the Mobile Switching Center Server, return the response message containing the IP address and the port number assigned for the call returned by the Mobile Switching Center Server; receive information about the IP address and the port number assigned for the call by the Base Station Controller, and establish IP bearer with the Base Station Controller; and the Base Station Controller is configured to transparently transmit a call request message to the Mobile Switching Center Server, receive the assignment message transmitted by the Mobile Switching Center Server, acquire the IP address and the port number of the Media Gateway contained in the message, assign the IP address and the port number for the call, initiate establishment of IP bearer, and transmit the assignment response message containing the IP address and the port number assigned for the call by the Base Station Controller to the Mobile Switching Center Server.

As can be seen from the technical solutions mentioned above, with the method, equipment and system for establishing GSM network bearer in embodiments of the present invention, by using IP bearer at the A interface between the BSC and the MGW to directly transmit HR/FR/EFR compression voice codes at the A interface, wasting of TC resources is effectively decreased, transcoder-free operation (TrFO) for full path or half path of the voice channel between BSCs on the calling and called sides is realized, and the voice quality is enhanced and equipment costs are saved.

DETAILED DESCRIPTION

In order to make the objects, technical solutions and advantages of the present invention clearer, a detailed description of the present invention is provided below with reference to the figures and embodiments.

Figure 1:
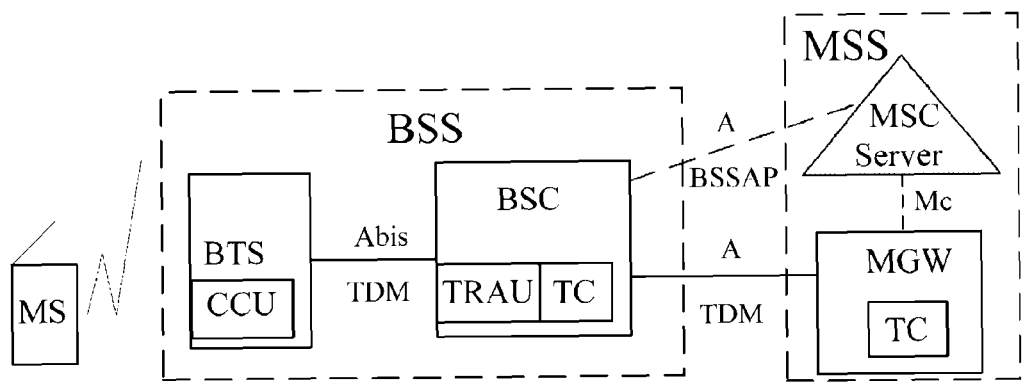
FIG. 1 is a diagram illustrating the GSM network architecture in the application of a method embodiment of the present invention.

The GSM system defined by the Third Generation Partnership Project (3GPP) standardization organization mainly consists of three parts: a Mobile Switching Subsystem (MSS), a Base Station Subsystem (BSS) and a Mobile Station (MS). FIG. 1 is a diagram illustrating the GSM network architecture in the application scenario of a method embodiment of the present invention. As shown in FIG. 1, the system includes an MSS, a BSS and an MS. The MSS implements the main switching functions of GSM, and at the same time manages subscriber data and a database required for mobility. The MSS also manages communications between GSM mobile subscribers and communications between a GSM mobile subscriber and a subscriber of another communication network. The MSS includes a Mobile Switching Center (MSC) server and an MGW. The BSS includes a BSC and a Base Transceiver Station (BTS). The BSC interfaces with the wireless network and is responsible for the management of the wireless network and wireless resources. The BSC is also responsible for managing the establishment, the connection and the releasing of calling/called MSs and BTS wireless connections on the calling/called side, providing functions such as voice coding, code type conversion and rate adaptation. The BTS performs conversion between the BSC and the wireless channel, and performs wireless transmission over the air interface between the BTS and MSs and realizes related control functions.

The interface between the BTS and the BSC is an Abis interface that transmits GSM voice and data messages with Time Division Multiplexing (TDM) codes and Channel Codec Unit (CCU) protocol frames. Each CCU channel occupies a bandwidth of 16 k. Voice coding formats include Half Rate (HR), Full Rate (FR) and Enhanced Full Rate (EFR) coding. The interface between the BSS and the MSC server is an A interface. On the side of the MGW where the MGW is connected with the BSC, the A interface between the BSC and the MGW is an MGW wireless side end point that transmits voice and data with TDM G.711 protocol. The coding method is G.711 and each call occupies a bandwidth of 64 kbps.

On the MSS side, the MSC server and the MGW use a mode of 3GPP R4 in which the bearer and the control are separated. All signaling controls are processed by the MSC server, and all bearers are processed by the MGW. An Nb interface is used between the MGW and another MGW. The coding method is typically AMR coding. An Internet Protocol (IP) transmission mode is used to increase transmission efficiency and save bandwidth. An Nc interface is used between the MSC server and the MGW. An A interface is used between the MSC server and the BSC for the bearing of messages such as messages about user's connection requests and messages about disconnection commands by transmitting the Base Station Subsystem Application Part (BSSAP) signaling. After being processed by the BSC, the messages are sent to the BTS. The BSSAP messages are defined by the GSM08.08 specification. An Nc interface is used between the MSC server and another MSC server to solve the problem of separate call controls and bearer controls using the Bearer Independent Call Control (BICC) protocol. The bearing of call control signaling on various networks is proposed for applications of telephone services, which may provide good transparency for implementing services of existing circuit-switched telephone networks in NGN.

Figure 2:
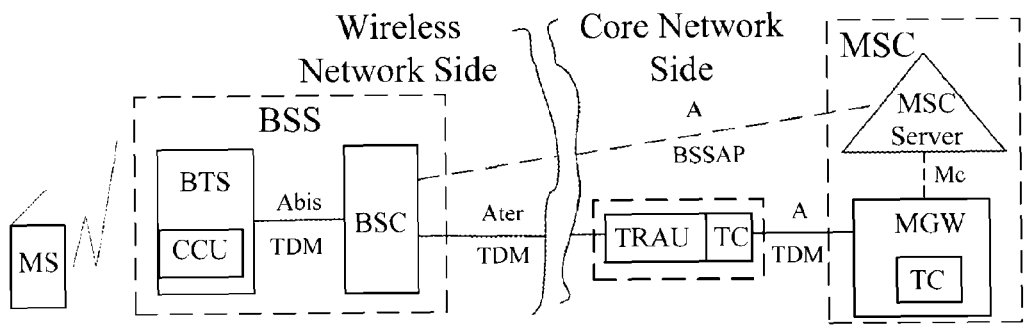
FIG. 2 is a diagram illustrating the improved GSM network structure on the calling/called side in the application of a method embodiment of the present invention.

FIG. 2 is a diagram illustrating the improved GSM network structure on the calling/called side in the application scenario of the method embodiment of the present invention. As shown in FIG. 2, an Ater interface is used between the BSC and the TRAU to transmit voice and data in format of TRAU frames. The original interfaces and bearer modes between the TRAU and the MGW remain unchanged. Since each call at the Ater interface occupies only a bandwidth of 16 k, four calls may be multiplexed into one TDM slot, hence saving the valuable long-distance transmission resources between the BSC and the MGW.

Embodiments of the present invention may effectively mitigate the wasting of TC resources and achieve full path or half path TrFO for the telephone channel by realizing the IP-based A interface between the BSC and the MGW and directly transmitting wireless side compressed voice codes such as HR/FR/EFR codes.

The present invention proposes a system for establishing a bearer for a GSM network. Changing interfaces of the GSM network into IP-based interfaces includes establishing an IP bearer and implementing code type negotiation. Media services and signaling are transmitted through the IP bearer, and the problem of voice quality deterioration due to the transcoding TC is solved.

Figure 3:
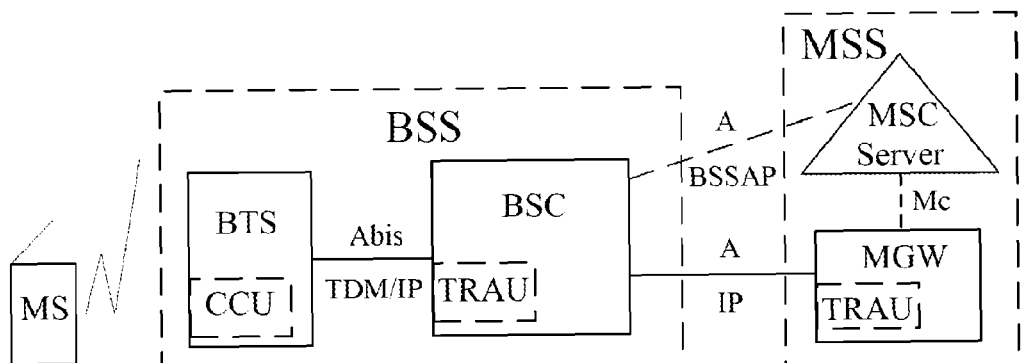
FIG. 3 is a diagram illustrating the system stricture of the GSM network with IP-based interfaces according to an embodiment of the present invention.

FIG. 3 is a diagram illustrating the system stricture of the GSM network with IP-based interfaces according to an embodiment of the present invention. Referring to FIG. 3, the system includes an MS, a BTS, a BSC, an MSC server and an MGW.

The MS is configured to transmit a call request message carrying information about the code types it supports to the BSC and receive a message returned by the MSC server indicating that the call is being processed.

The BTS is configured to transparently transmit the call request message sent by the MS and the message sent by the MSC server indicating that the call is being processed.

The BSC is configured to establish an IP bearer with the MGW and implement code type conversion, receive the call request message transmitted by the MS, transparently transmit it to the MSC server, receive and forward the message transmitted by the MSC server indicating that the call is being processed; and receive an assignment message transmitted by the MSC server. If the interface between the BSC and the MGW is determined to be an A interface, the IP address and the port number of the wireless side of the MGW is obtained and the IP address and the port number of its own are assigned for the call, and an IP bearer is established.

If the interface between the BSC and the MGW is determined to be an Ater interface, the establishment of the Ater interface channel between the BSC and the MGW is negotiated using in-band signaling of the bearer plane through TRAU signaling (the in-band signaling between the BSC and the MGW may be established in advance). The IP address and the port number assigned for the call by the MGW are acquired and the IP address and the port number of its own are assigned for the call. The MGW acquires the IP address and the port number assigned for the call by the BSC via the Ater interface channel and an IP bearer is established. Alternatively, the Ater interface between the BSC and the MGW is simulated as an A interface, and the BSC receives the assignment message, acquires the IP address and the port number of the wireless side of the MGW and assigns the IP address and the port number of its own of the Ater interface side for the call, and an IP bearer is established.

An assignment message transmitted by the MSC server is received. A code type is selected according to priority list of the code type or its own policy, and the code type selected by the BSC is fed back to the MSC server through an assignment response message. If the selected code type is consistent with the code type with the highest priority in the priority list of the code type, the TrFO in this segment is realized and the transparent transmission of media stream is accomplished; otherwise, a message for changing the code type is received from the MSC server and code type conversion between the code type selected by the BSC and the code type required by the MSC server is performed.

The MSC server separates the bearer and the control, and is configured to: process the signaling control part, transmit IP bearer information such as the IP address and the port number by extended BSSAP signaling, receive the call request message transmitted by the MS, extract information about the code type in the call request message, find the intersection with the code types it supports, and establish the priority list of the code type; transmit a message to the MS indicating that the call is being processed, transmit a message to the MGW for adding a wireless side end point, and receive the response message returned by the MGW; transmit or receive a message carrying the priority list of the code type information to or from other MSC servers, and accomplish code type negotiation for realizing TrFO; transmit an assignment message to the BSC, and receive an assignment response message containing information about the selected code type transmitted from the BSC; perform code type negotiation and transmit a bearer and code type modify message to the MGW, where the bearer and code type modify message carries the IP address and the port number information assigned for the call by the BSC; and distribute the message for changing the code type to the BSC or the MGW as necessary, if the code type conversion function is realized at the BSC.

The MGW is configured to: establish an IP bearer with the BSC and perform code type conversion, receive a message for adding a wireless side end point transmitted by the MSC server, transmit the response message containing the IP address and the port number assigned for the call to the MSC server, receive the bearer and code type modify message transmitted by the MSC server, acquire the IP address and the port number assigned for the call by the BSC, and establish an IP bearer; modifies the code type for the corresponding end point as instructed by the message.

In the system shown in FIG. 3, the MGW(s) may be a same MSW or may be different MGWs. When the MGWs are different MGWs, the process of establishing the IP bearer connection for the A interface between the BSC on the other side and the MGW is similar to that of the system shown in FIG. 3, and the description of the process will not be repeated.

Also, the MSC server(s) may be a same MSC server or may be different MSC servers. When the MSC servers are different MSC servers, an Nc interface is used between the MSC servers and an Nb interface is used between the MGWs. The MSC server at the calling side transmits initialization (IAM) information to the MSC server at the called side, and the MSC server at the called side returns IP bearer information to establish an IP bearer between the Nb interface side of the MGW at the calling side and the Nb interface side of the MGW at the called side. The BICC and the IP Bearer Control Protocol (IPBCP) may be referred to for details. The process of establishing the IP bearer connection between the wireless side of the MGW and the BSC on both the calling side and the called side is similar to the process of establishing the IP bearer connection between the wireless side of the MGW and the BSC on either the calling side or the called side, in which code type negotiation is required for the establishment of TrFO and the establishment of the IP bearer. The difference is that: if both sides are IP bearers, a full path TrFO negotiation for voice channel is required to be performed; but if only one side is an IP bearer, only a voice channel with half path TrFO may be established.

In FIG. 3, the assignment response message should include information such as information about the code type selected by the BSC, the IP address and the port number assigned for the call by the BSC.

In practical applications, alternatively, code type negotiation and modifying may be performed after the establishment of the IP bearer by the BSC with the MGW. The specific process is described as follows.

First, base station control devices such as the BSC remove the TRAU encapsulation (i.e., the processing of TRAU termination) of the received wireless side data to obtain payload data after voice compression coding. After that, the payload data after voice compression coding is encapsulated in IP packets, passed to the MGW via the A interface between the BSC and the MGW. The MGW continues to perform service transmission processing.

In the implementation of the process of removing TRAU encapsulation described above, the voice compression coding method of the current frame may be obtained according to a certain bit in it. After that, the data is subject to corresponding processing according to the acquired coding method. For example, for the FR coding method, an FR voice of 20 ms has exactly 260 bits and D1 through D260 are the final voice compression coded payload data. For the EFR coding method, the non-EFR coded voice data for Cyclic Redundancy Check (CRC) in the 260 bits need to be removed to obtain the final 244 bits of data corresponding to the EFR voice of 20 ms, and so on.

In practical applications, after the MGW receives the voice compression coded payload data (i.e., payload data after compressed coding) transmitted via IP packets by the BSC, at least one of the following two treatments may further be carried out:

(1) determining whether the compression coding method used for the voice compression coded payload data is the same as the compression coding method used on the receiving end side of the data (the Nb interface or the A interface on the other side); and (2) determining whether the encapsulation method used for the voice compression coded payload data is the same as the encapsulation method used on the receiving end side of the data.

In the determinations described above, if the determination result is positive, the data is directly passed to the receiving end of the data. Otherwise, at least one of the compression coding method and the encapsulation method of the data that is determined to be different is converted into the compression coding method and/or the encapsulation method used on the receiving end side and then transmitted to the receiving end.

In order for the MGW to be able to identify and determine the compression coding method used for the voice compression coded payload data, the corresponding processing may be as follows. First, the BSC transmits the compression coding method used for the received voice compression coded payload data to the MSC server. After that, the MSC server transmits the compression coding method used for the data to the MGW, so that the MGW knows the corresponding compression coding method.

Furthermore, in order for the MGW and BSC to learn the bearer information of the received data, the bearer information used for the transmitted data may also be transmitted to the MSC server by the BSC, and transmitted by the MSC server to the MGW. The bearer information used for the transmitted data may alternatively be transmitted to the MSC server by the MGW, and transmitted by the MSC server to the BSC.

The service transmission processes provided in embodiments of the present invention includes a service transmission process in the Second Generation Mobile Communication System and a service transmission process between the Second and the Third Generation Mobile Communication Systems, which will be described respectively in the following.

In the Second Generation Mobile Communication System, for single rate coding, service transmission between the MGW on the calling user side and the MGW on the called user side is not realized with a user plane encapsulation method. In other words, the user plane encapsulation operation is not conducted at the MGW.

In the Second Mobile Communication System and the Third Generation Mobile Communication System, if a single rate coding is used between the MGW at the calling user side and the MGW at called user side, service transmission between the two MGWs is not realized with the user plane encapsulation method. In other words, the user plane encapsulation operation is not conducted at the MGW. If a multiple rate coding is used, the service transmission is realized with the user plane encapsulation method. In other words, corresponding user plane encapsulation operation needs to be carried out at the MGW.

In the processing described above, a Real-time Transmission Protocol (RTP) encapsulation method is used for the service transmission between the BSC and the MGW.

An example is as follows, in which the Abis interface between the BTS and the BSC is a TDM bearer. At the BSC, only the conversion from TDM bearer to IP bearer and the termination of TRAU, i.e., the processing of removing TRAU encapsulation, are performed, without transcoding. In other words, transmitted between the BSC and the MGW are the GSM compression coded data. The corresponding compression coding method may be HR coding, FR coding, EFR coding or AMR (adaptive rate) coding. In the BSC, the GSM compressed coded voice payload is encapsulated as RTP messages and transmitted to the MGW. No codec conversion TC needs to be remained any longer in the BSC.

Figure 4:
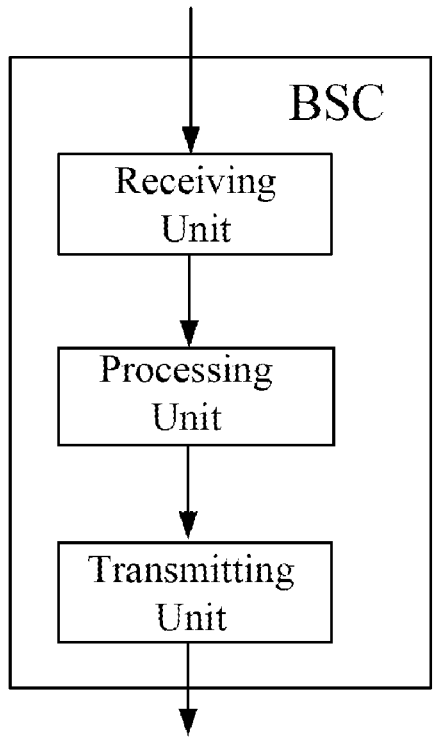
FIG. 4 is another diagram illustrating the architecture of the BSC according to an embodiment of the present invention.

FIG. 4 is a diagram illustrating the architecture of the BSC according to an embodiment of the present invention. Referring to FIG. 4, the BSC includes:

a receiving unit, configured to receive an assignment message and transmit the assignment message to a processing unit;

a processing unit, configured to receive the assignment message, acquire the IP address and the port number of the wireless side end point of the Media Gateway contained in the message, assign the IP address and the port number for a call, initiate the establishment of an IP bearer, and transmit an assignment response message containing the IP address and the port number assigned for the call by the equipment to a transmitting unit; and a transmitting unit, configured to receive and transmitting the assignment response message.

After receiving the assignment message, the processing unit may further select a code type according to the priority order in a priority list of the code type or a preset policy and transmit the selected code type in the assignment response message to the MSC server via the transmitting unit.

In practical applications, the BSC may also be configured to remove the TRAU encapsulation of the received wireless side data to obtain the voice compression coded payload data and encapsulate the voice compression coded payload data in IP packets. It may also be configured to transmit information about the compression coding method used for transmitting data in user plane and/or bearer information to the MSC server and the MSC server transmits information about the compression coding method and/or the bearer information of the data to the MGW. At the same time, it may also receive information about the compression coding method and/or the bearer information transmitted by the MGW via the MSC server.

Figure 5:
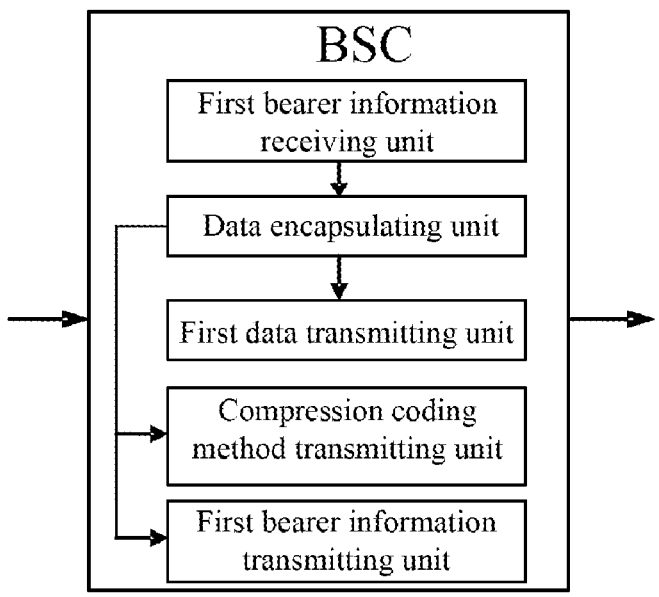
FIG. 5 is another diagram illustrating the architecture of the BSC according to an embodiment of the present invention.

FIG. 5 is another diagram illustrating the architecture of the BSC according to an embodiment of the present invention. Referring to FIG. 5, the BSC includes the following units:

(1) a TRAU terminating unit, configured to remove TRAU encapsulation from the received wireless side data to obtain the voice compression coded payload data;

(2) a data encapsulating unit, configured to encapsulate the voice compression coded payload data obtained through processing by the TRAU terminating unit into IP packets and transmit it to a first data transmitting unit; and (3) a first data transmitting unit, configured to transmit the IP packets encapsulated by the data encapsulating unit to the Media Gateway.

Optionally, the BSC further includes at least one of a compression coding method transmitting unit, a first bearer information receiving unit and a first bearer information transmitting unit.

The compression coding method transmitting unit is configured to transmit information about the compression coding method used for the data transmitted in user plane to the MSC server.

The first bearer information receiving unit is configured to receive the bearer information used for the data passed by the MGW from the MGW via the MSC server.

The first bearer information transmitting unit is configured to transmit the bearer information used for the data transmitted in user plane to the MSC server.

In practical applications, the Transcoder and Rate Adoption Unit, the terminating unit and the data encapsulating unit may also be included in the processing unit as sub-units of the processing unit.

In practical applications, the processing unit may further include a code converting module for converting code types according to the code change message distributed by the Mobile Switching Center Server.

Figure 6:
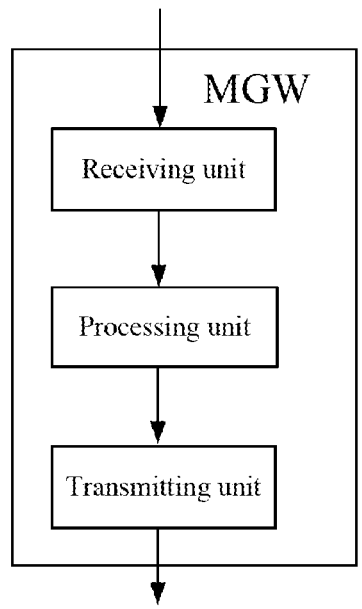
FIG. 6 is a diagram illustrating the architecture of the MGW according to an embodiment of the present invention.

FIG. 6 is a diagram illustrating the architecture of the MGW according to an embodiment of the present invention. Referring to FIG. 6, the MGW includes:

a receiving unit, configured to receive a message for adding a wireless side end point, receive a bearer and code type modify message, and transmit them to a processing unit;

a processing unit, configured to receive the message for adding a wireless side end point, assign an IP address and a port number for a call, output a response message containing the IP address and the port number assigned for the call to a transmitting unit; receive the bearer and code type modify message, acquire the IP address and the port number assigned for the call by the BSC, and establish the IP bearer with the BSC; and a transmitting unit, configured to receive and transmitting the response message.

In practical applications, the MGW may farther be configured to continue the transmitting of IP packets carrying voice compression coded payload data with TRAU encapsulations removed after acquiring IP packets via the A interface between the base station control device and the Media Gateway. It may further communicate with the MSC server to acquire the compression coding method information from the MSC server which is received from the BSC and learn the corresponding compression coding method. And, it transmits the bearer information used for the locally transmitted data to the MSC server to transmit the bearer information to the BSC via the MSC server. That is, it reports the bearer information assigned for the call by the MGW at the wireless side end point to the MSC server, and the bearer information is then distributed to the BSC to allow each of the MGW and the BSC to establish a bearer between them after acquiring the bearer information from each other.

Figure 7:
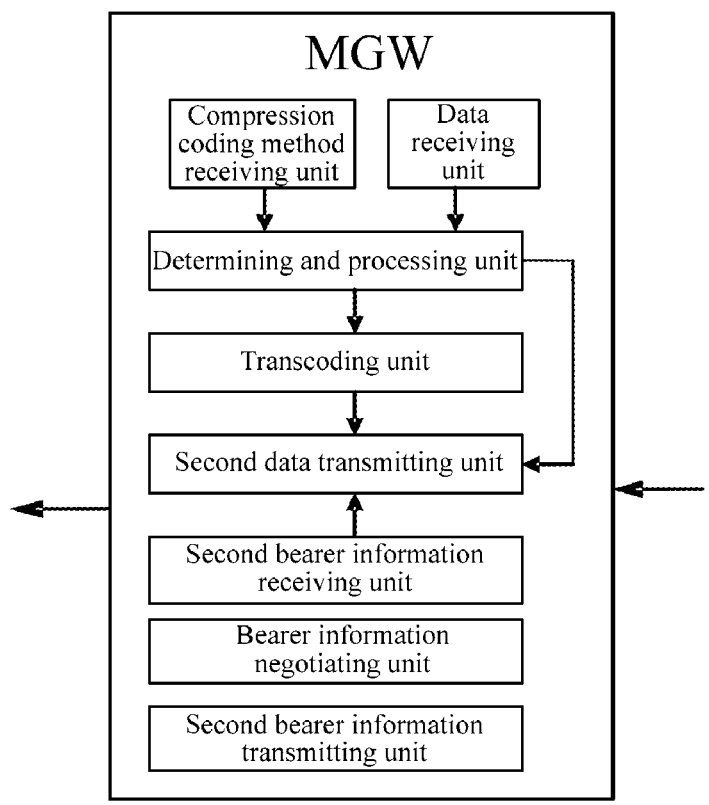
FIG. 7 is another diagram illustrating the architecture of the MGW according to an embodiment of the present invention.

FIG. 7 is another diagram illustrating the architecture of the MGW according to an embodiment of the present invention. Referring to FIG. 7, the MGW may include the following units:

(1) a data receiving unit, configured to receive the voice compression coded payload data contained in IP packets transmitted via the A interface;

(2) a conversion processing unit, configured to convert the compression coding method and/or the encapsulation method of the data in the IP packets into the compression coding method and/or the encapsulation method used on the receiving end side, and then incorporate the data in IP packets, i.e., perform corresponding conversion processing between two sides of the MGW; and (3) a second data transmitting unit, configured to transmit the IP packets processed by the conversion processing unit to the MGW where the receiving end of the data is.

Optionally, the MGW may further include a determination processing unit for determining whether the compression coding method and/or encapsulation method used for the data in the IP packets are the same as the compression coding method and/or encapsulation method used on the receiving end side of the data. If the compression coding methods and/or encapsulation methods are the same, the IP packets are directly transmitted to the data transmitting unit. Otherwise, the IP packets are transmitted to the conversion processing unit. That is, the MGW may select to determine at least one of the compression coding method and the encapsulation method used for corresponding data between two sides of the MGW to perform a corresponding conversion processing according to the determination result.

Optionally, the MGW may further include at least one of a compression coding method receiving unit, a second bearer information transmitting unit and a second bearer information receiving unit.

The compression coding method receiving unit is configured to receive from the MSC server the compression coding method used for the data transmitted in user plane by the BSC and provide the compression coding method to the compression coding method determining unit.

The second bearer information transmitting unit is configured to transmit the bearer information used for the data transmitted by the MGW to the MSC server to transmit the bearer information to the BSC via the MSC server.

The second bearer information receiving unit is configured to receive from the MSC server the bearer information used for the data transmitted by the BSC in user plane and provide it to the data transmitting unit.

Optionally, the MGW may further include a bearer information negotiating unit for negotiating bearer information used during data transmission with the MGW at the opposite end.

Figure 8:
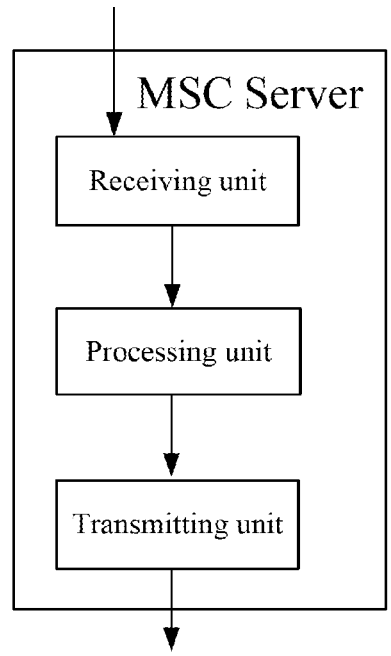
FIG. 8 is a diagram illustrating the architecture of the MSC server according to an embodiment of the present invention.

FIG. 8 is a diagram illustrating the architecture of the MSC server according to an embodiment of the present invention. Referring to FIG. 8, the MSC server includes:

a receiving unit, configured to receive a call request containing information about the code types supported by itself transmitted by the MS, a response message containing the IP address and the port number assigned for the call returned by the MGW wireless side end point and an assignment response message returned by the BSC, and transmit them to the processing unit;

a processing unit, configured to establish a priority list of the code type according to the call request message, transmit to the transmitting unit a message for adding a wireless side end point; generate an assignment message according to the received response message and the priority list of the code type, and output it to the transmitting unit; conduct code type negotiation according to the received assignment response message and output a bearer and code type modify message containing information on the IP address and the port number assigned to the call by the Base Station Controller to the transmitting unit; and a transmitting unit, configured to receive and transmit to the MGW wireless side end point the message for adding a wireless side end point and the bearer and code type modify message containing information on the IP address and the port number assigned for the call by the Base Station Controller which is output by the processing unit; and receive the assignment message output by the processing unit and transmit it to the BSC.

Based on the system shown in FIG. 3, seven embodiments are illustrated below to describe in detail specific implementations of applications of the present invention during the implementation of the GSM network with IP-based interfaces. In the diagrams showing system structures of the seven embodiments of the present invention, broken lines denote signaling information and solid lines denote bearer information.

Embodiment 1

Figure 9:
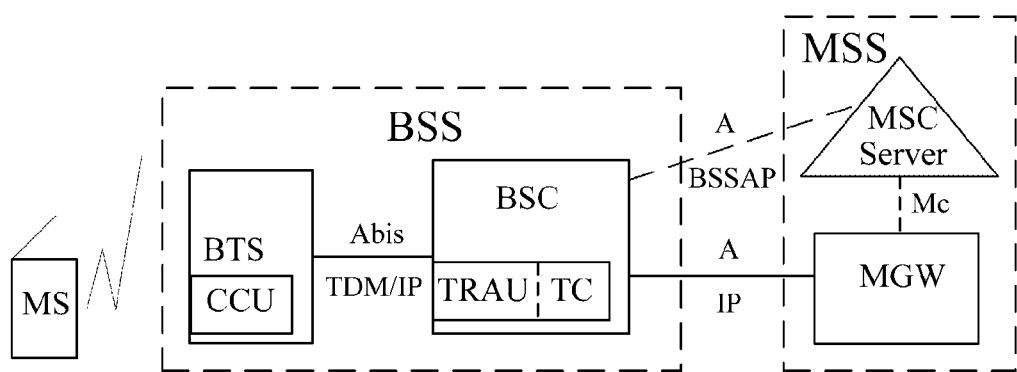
FIG. 9 is a diagram illustrating the system structure of the GSM network with an IP-based A interface according to the first embodiment of the present invention.

FIG. 9 is a diagram illustrating the structure of the GSM network with an IP-based A interface in the first embodiment of the present invention. By taking BTS, BSC, MSC server and the MGW included on the calling side as an example, the present embodiment illustrates that the transcoding TC is arranged on the BSC side and the A interface is IP-based. The IP-based A interface on the called side is similar to that on the calling side and will not be described in detail. Referring to FIG. 9, the interface between the BTS and the BSC is an Abis interface, and the interface between the BSC and the MGW is an A interface. On the side of the MGW where the MGW is connected with the BSC is the MGW wireless side end point. The interface between the MGW and the MSC server is an Mc interface.

The A interface control plane is based on the Signal Transmission (Sigtran) protocol specified in standards. In the present embodiment, in order to realize the IP-based A interface, it is required to extend the function of the management of the IP-based voice resources of the A interface control plane and to extend necessary BSSAP information. For example, the extended BSSAP message has the ability to transmit IP bearer information such as IP addresses and port numbers.

The MS initiates a call containing information on code types supported, which is transmitted transparently via the BTS. The BSC receives the call request message and transmits it to the MSC server via BSSAP signaling. The MSC server acquires information about the code types supported by the calling side, finds the intersection with the code types supported by the MSC server, and forms a priority list of the code type. The MSC server transmits a message for adding a wireless side end point to the MGW via the Mc interface. The MGW receives the message for adding a wireless side end point, assigns an IP address and a port number for the call, and returns a response message for the IP address and the port number assigned for the call by the MGW to the MSC server via the Mc interface. The MSC server receives the response message from the MGW. The MSC server transmits the assignment message containing the IP address, the port number assigned for the call by the MGW and the priority list of the code type of the MSC server to the BSC via BSSAP signaling. The BSC receives the assignment message, assigns the IP address and the port number of its own side for the call and initiates the establishment of the IP bearer. At the same time, the BSC selects code types according to the priority list of the code type information or its own policy, and returns an assignment response message containing information about the code type selected by the BSC and the IP address and the port number assigned for the call by the BSC to the MSC server. The MSC server receives the assignment response message, acquires from the message the IP address and the port number assigned for the call by the BSC and transmits a bearer and code type modify message to the MGW wireless side end point. The MGW wireless side end point may establish an IP bearer with the BSC once it acquires the IP address and the port number assigned for the call by the BSC. At the same time, the MSC server receives the assignment response message, acquires the code type selected by the BSC from the message, places the code type selected by the BSC on the calling side at the first position in the priority list of the code type and then transmits the priority list of the code type to the MSC server on the called side. In the backward transmission process, the code types of the end points related to the MGWs in the path is indicated or changed to the optimum code type, namely the code type selected by the BSC. The MSC server on the called side distributes the acquired priority list of the code type to the BSC on the called side. If the BSC on the called side supports the code type selected by the BSC on the calling side, and selects the optimum code type, a full path TrFO voice channel is realized. Otherwise, the BSC on the called side feeds back the selected code type to the MSC server on the called side with an assignment response message. The MSC server on the called side then distributes a message for changing the code type to the BSC on the called side or to the BSC on the calling side via the MSC server on the calling side. The BSC on the called side, the MGW on the called side, the BSC on the calling side or the MGW on the calling side conducts conversion between the code type selected on the calling side and that selected on the called side after receiving the message for changing the code type.

If between the MGW on the called side and the BSC on the called side is a TDM bearer, and the BSC on the called side supports the code type selected by the BSC on the calling side and selects the optimum code type, the MSC server on the called side distributes a bearer format conversion message to the MGW on the called side on which a bearer format conversion from IP to TDM is accomplished. Here, the MSC server on the called side returns the negotiated code type to the MSC server on the calling side and TrFO may be realized on the called side. Otherwise, if the BSC on the called side does not support the code type selected by the BSC on the calling side, the MSC server on the called side selects one code type from the code types supported by the BSC on the calling side according to certain rules, returns the selected code type to the MSC server on the calling side and distributes the selected code type to the MGW on the called side with a code type modify message. The code type conversion and the bearer format conversion from IP to TDM are achieved at the same time at the MGW on the called side. Similarly, if between the MGW on the calling side and the BSC on the calling side is a TDM bearer, the code type conversion and the bearer format conversion from IP to TDM are achieved at the same time at the MGW on the calling side. However, the code type negotiation processes between MSC servers are different. The MSC server on the calling side indicates that the code type selected by the BSC on the called side should be returned in the message sent to the MSC server on the called side. Therefore the MSC server on the called side passes information about the code type selected by the BSC on the called side to the MSC server on the calling side and modifies the code types of the end points related to the MGW in the path into the code type selected by the BSC on the called side. Then the MSC server on the calling side distributes information about the code type selected by the BSC on the called side to the end points of the Nb interface of the MGW on the calling side, namely end points on both sides of the core network. Thus it is ensured that code types are the same for all IP bearer parts and TC is inserted into only the TDM to IP conversion point.

Figure 10:
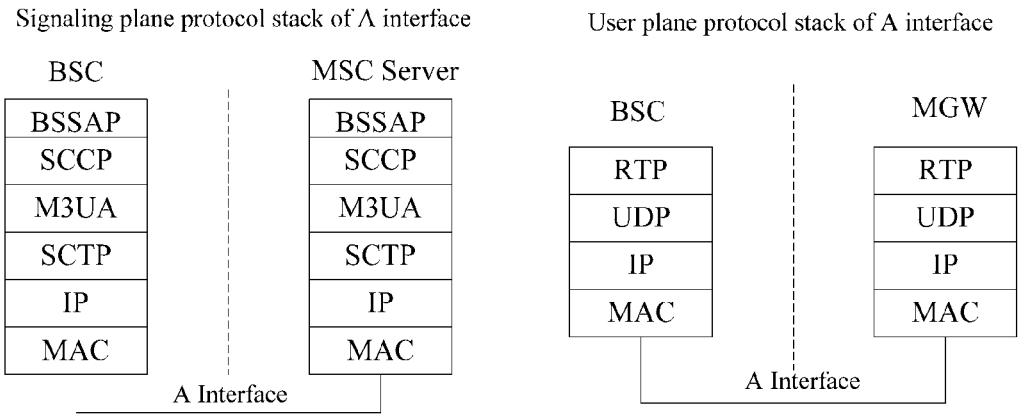
FIG. 10 is a diagram illustrating the hierarchical structure of the protocol stack of the signaling plane and the bearer plane of the A interface of the system shown in FIG. 9 according to an embodiment of the present invention.

FIG. 10 is a diagram illustrating the hierarchical structure of the protocol stack of the signaling plane and the bearer plane of the A interface of the system shown in FIG. 9 according to the embodiment of the present invention. Referring to FIG. 10, the bottom layer of the A interface signaling plane protocol stack is a Media Access Control (MAC) layer. If the protocol of the physical layer is not a hundred-megabit or gigabit Ethernet but a Packet Over SONET/SDH/GE (Gigabit Ethernet) (POS) point-to-point protocol or IP over E1, the bottom layer is a Point-to-Point Protocol (PPP) layer. From here tip, the second layer is an IP layer, the third layer is a Stream Control Transmission Protocol (SCTP) layer, the fourth layer is an M3 User Adaptation (M3UA) layer, the fifth layer is a Skinny Client Control Protocol (SCCP) layer and the top layer is a BSSAP layer. Signaling is transmitted sequentially among the layers. In the present embodiment, the BSSAP protocol of the BSSAP layer and the function of the management of the IP-based voice resources need to be extended accordingly.

If the IP interface is a hundred-megabit or gigabit Ethernet, the bottom layer of the A interface bearer plane protocol stack is an MAC layer. If the IP interface is a POS interface or an IP over E1 interface, the bottom layer is a PPP layer. From here up, the second layer is an IP layer, the third layer is a User Data Protocol (UDP) layer, and the fourth layer is a Real-time Transmission Protocol (RTP) layer. The bearer information is transmitted sequentially among the layers.

In practical applications, voice frames based on IP protocol may also be transmitted by changing the original TDM bearer of the Abis interface between the BTS and the BSC to an IP bearer. This can further lower the time delay caused by the network bearer conversion and increase utilization ratio of the transmission resources.

Also, MSC servers at the calling and called side in the embodiment may be a same MSC server or may be different MSC servers. When the MSC servers are different MSC servers, after acquiring the code type selected by the corresponding BSC, the MSC server on one side negotiates coding with the MSC server on the other side. If there is no any consistent code type which both the two sides accept, TC is inserted only in the BSC on one side for transcoding.

As seen from the above-described embodiments of the present invention, an IP bearer is established at the A interface between the BSC and the MGW through the MSC server, which effectively decreases the number of conversions of voice coding formats and even eliminates the necessity of such a conversion, decreases the delay of voice transmission, increases the quality of voice transmission and saves TC resources. At the same time, since an IP bearer is used, valuable long-distance transmission resources between the BSC and the MGW are saved. For example, in the existing GSM network system, tip to 4 TCs are required between the BSCs on the calling and called sides for the conversion of different code types and bearers. After the IP bearer is established at the A interface, no or only 1 TC is required between the BSCs on the calling and called sides for the conversion of code types and no bearer conversion is needed. If the Abis interface is further changed to be IP bearer, no bearer conversion is needed along the entire call path between the MSs on the calling and called sides.

In the first embodiment described above, TCs are disposed on the BSC side. In practical applications, TCs may alternatively be disposed on the MGW side and an IP bearer is implemented for the A interface. In the case that TCs are disposed on the MGW side, TRAU frames may be terminated at the BSC side or at the MGW side. Specific implementations will be explained below in connection with the second and third embodiments respectively.

Embodiment 2

Figure 11:
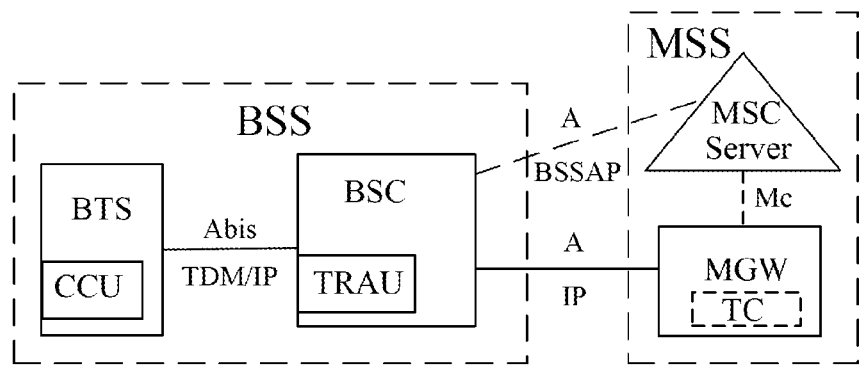
FIG. 11 is a diagram illustrating the system structure of the GSM network with an IP-based A interface according to the second embodiment of the present invention.

FIG. 11 is a diagram illustrating the structure of a GSM network with an IP-based A interface in the second embodiment of the present invention. In the present embodiment, the BTS, BSC, MSC server and the MGW included on the calling side are taken as an example. The MSC servers and the MGWs on the calling side and the called side may be the same MSC server and the same MGW, respectively. TCs are disposed on the MGW side and TRAU frames are terminated at the BSC side. That is, between the BSC and the MGW is an A interface which realizes IP bearer, and the encapsulation and transmission of services to be transmitted are realized using an IP-based encapsulation method between the BSC and the MGW. For example, services to be transmitted such as compression coded voice services are encapsulated in IP messages, IP-based User Data Protocol messages or IP-based RTP messages.

The A interface control plane is based on the Sigtran protocol bearer specified in standards. The resources management function of the IP voice bearer needs to be extended. The BSSAP information is extended to enable the extended BSSAP information to transmit IP bearer information such as IP addresses and port numbers. The A interface service plane utilizes an IP bearer.

The establishment of IP bearer connection at the A interface of the system shown in FIG. 11 is similar to that of FIG. 9 with the difference that code type conversions are all performed at the MGW instead of the BSC. After the BSC selects a code type, the BSC incorporates the information on the code type selected by the BSC into the assignment response message of the MSC server via BSSAP signaling and the MSC server is in charge of code type negotiation. If the BSC on the called side supports the code type selected by the BSC on the calling side, and the optimum code type is selected, TrFO of the voice channel is realized. Otherwise, the MSC server on the called side receives the assignment response message of the BSC on the called side and distributes the code type selected by the BSC on the called side to the MGW wireless side end point on the called side via a code type modify command through the Mc interface. Alternatively, the MSC server on the called side forwards the code type selected by the BSC on the called side to the MSC server on the calling side. The MSC server on the calling side distributes the code type selected by the BSC on the called side to the Nb side end point of the MGW on the calling side via a code type change command. After receiving the command, the MGW compares the code type with that selected by the BSC on the calling side. If they are not the same, TCs are inserted.

The hierarchical structure of protocol stack on the A/Ater interface signaling plane is the same as that shown in FIG. 10.

If only one side of the A interface on the calling/called sides is IP-based while the other side is of TDM, the code type conversion always occurs at the MGW of which the A interface is of TDM. The specific implementation is similar to that of the first embodiment.

Similarly, the original TDM bearer at the Abis interface between the BTS and the BSC may also be replaced with an IP bearer to further reduce the time delay caused by network bearer conversion and increase utilization ratio of transmission resources.

In the case that TCs are disposed on the MGW side and TRAU frames are terminated on the BSC side, an embodiment of the present invention also provides detailed implementation solutions for the A interface, Nb interface and Mc interface, which will be described one by one below.

I. Voice Protocol Stack at the A Interface

Figure 12:
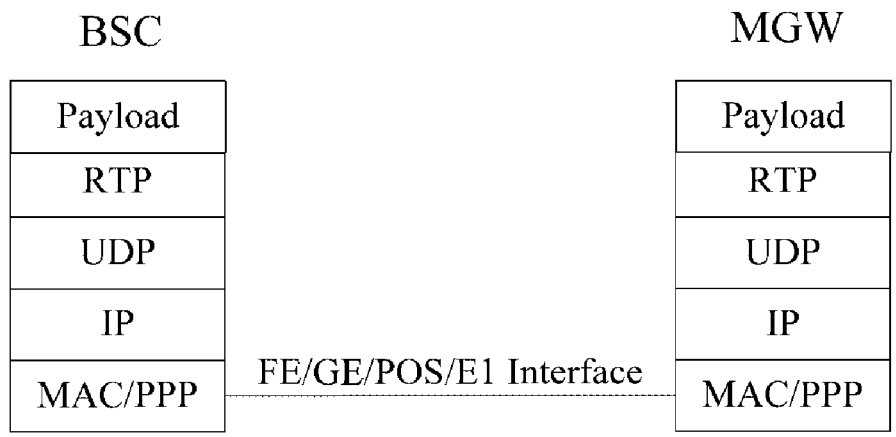
FIG. 12 is a diagram illustrating the voice message encapsulation structure at the Abis interface according to the second embodiment of the present invention.

FIG. 12 is a diagram illustrating the voice message encapsulation structure at the Abis interface according to the second embodiment of the present invention. Referring to FIG. 12, no matter whether the Abis interface is based on IP or TDM, the TRAU in the BSC uniformly encapsulates voice messages at the Abis interface into an RTP encapsulation format without any user plane (UP), which includes from bottom to top an MAC or PPP protocol layer, an IP layer, an UDP layer, an RTP layer and a payload layer.

The corresponding bottom layer is an MAC layer for an FE (Fast Ethernet) or a GE (Gigabit Ethernet) interface and is a PPP layer for a POS and IP over E1 interface.

For a coding method of EFR, FR or HR, the Payload layer of the corresponding top layer bears the payload of the voice messages. For its specific byte order encapsulation format, the encapsulation method defined in the European Telecommunications Standards Institute (ETSI) standard (ETSI ts_101318) may be used. For the AMR coding method, since it is a variable rate voice coding with a process of adjusting in-band voice rate, the encapsulation method defined in the Internet Engineering Task Force Request For Comments (IETF RFC3267) standard is used for the corresponding Payload layer.

In embodiments of the present invention, to be in accordance with TRAU, the packet time for voice service may be uniformly set as 20 ms specifically.

Taking GSM as an example, the coding methods often used include EFR, FR, HR or AMR. Each of the clock rates for EFR and FR is 8000 Hz. The Payload Type (PT) for FR is a static 3. The PT for EFR is dynamic (96-127).

In the case of FR coding method, corresponding processing is relatively simple due to the static PT.

In the case of EFR coding method, due to the PT of EFR coding for A interface, the BSSAP signaling needs to be extended so that the PT of EFR between the BSC and the MGW is negotiated between the MSC server and the BSC. Alternatively, the corresponding PT is preconfigured at the MSC server and then distributed to the BSC and the MGW via the BSSAP message and the Mc message. Alternatively, the corresponding PT (with its value ranging 96-127) is determined by configurations on the BSC and the MGW and it is enough to keep both sides the same.

For other coding methods such as HR, it may be implemented with reference to the PT determining method described above, for example, being consistent with EFR or using a dynamic PT, for which detailed description is omitted.

Definitions of PT values corresponding to different coding methods and data services may be the following values specifically:

FR: 3;
EFR: 96-127;
HR: 96-127;
AMR: 96-127;
DATA(data service): 96-127;
RED(redundancy): 96-127;

For each of the EFR, HR, AMR or data services, the data redundancies are all dynamic PTs with specific values collectively distributed to the MGW and the BSC by the MSC server.

Corresponding PTIME (packet time): 20 ms.

DTX (Discontinuous transmission): Both the BSS and the MGW need support.

II. Implementation of the Mc Interface

The MSC server provides the bearer information of the A interface to the MGW via the Mc interface.

Specifically, the BSC reports its own bearer information such as the IP address and the port number to the MSC server via the extended BSSAP message, and the MSC server distributes the bearer information from the BSC and the code type negotiation result to the MGW. At the same time, the MSC server further receives the bearer information of MGW transmitted from the MGW and distributes it to the BSC.

For different coding methods, the SDP (Session Description Protocol) message of the bearer information distributed by the MSC server is defined as follows:

(1) FR coding
c=IN IP4 10.10.10.1;
m=audio 49120 RTP/AVP 3:
a=ptime:20;

Where c refers to the connection information, m refers to the media name and the transmission address and a=ptime refers to the packet time.

(2) EFR coding
c=IN IP4 10.10.10.1;
m=audio 49120 RTP/AVP 98:
a=rtpmap:98 GSM-EFR/8000;
a=ptime:20;

Where a=rtpmap refers to the media attribute lines, namely coding name.

(3) HR coding
c=IN IP4 10.10.10.1;
m=audio 49120 RTP/AVP 98;
a=rtpmap:98 GSM-HRW8000;
a=ptime:20;

(4) AMR coding
See detailed definition in RFC3267.
c=IN IP4 10.10.10.1:
m=audio 49120 RTP/AVP 97;
a=rtpmap:97 AMR/8000/1;
a=fmtp:97 mode-set=0,2,5,7;
a=maxptime:20;

(5) Data service
c=IN IP4 10.10.10.1;
m=DATA 49120 RTP/AVP 97;

SERVER ensures that the above PTs are different from each other.

III. Implementation of the Nb Interface

The corresponding PT is negotiated by the Nb interface using the IPBCP.

To realize TRFO, the processing at the Nb interface should be kept consistent with that at the A interface as much as possible. For a 2 G to 2 G call, the encapsulation method without UP is used whether it is a single rate coding or a multiple rate coding. For a 2 G to 3 G call, an encapsulation method consistent with that at A interface is used for single rate coding and an encapsulation method with UP is used in the case that both 2 G and 3 G use the AMR coding.

(1) Calling Procedure for Single Rate Coding/Decoding

Figure 13:
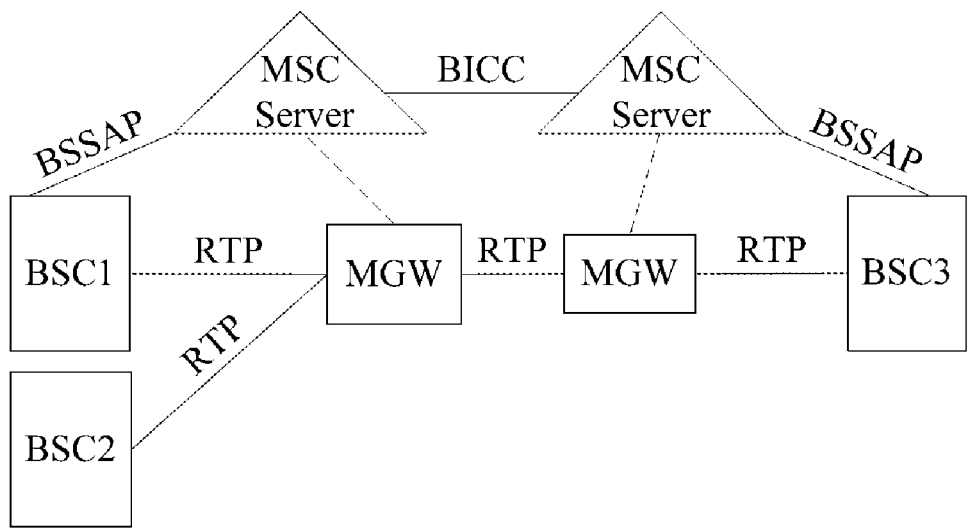
FIG. 13 is a diagram illustrating the 2 G to 2 G calling procedure according to the second embodiment of the present invention.

FIG. 13 is a diagram illustrating a 2 G to 2 G calling procedure according to the second embodiment of the present invention. Referring to FIG. 13, the call from BSC1 to BSC2 is an intra-office call and the call from BSC1 to BSC3 is an inter-office call. Whether intra- or inter-office call, the UP encapsulation method is not used for single rate coding/decoding (HR/FR/EFR). Instead, a mode in which voice messages are directly encapsulated with RTP messages is used.

Figure 14:
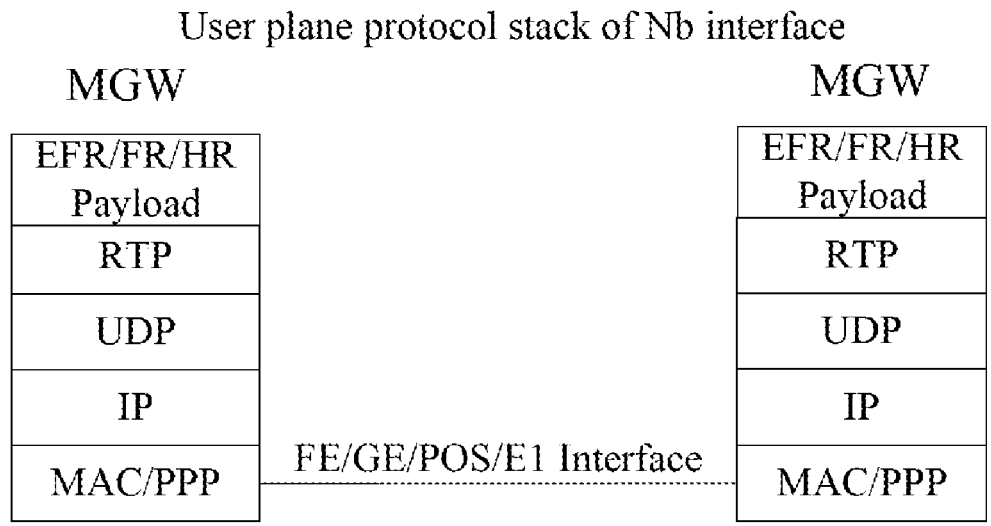
FIG. 14 is a diagram illustrating first architecture of the user plane protocol stack of the Nb interface according to the second embodiment of the present invention.

FIG. 14 is the first diagram illustrating the architecture of the user plane protocol stack at the Nb interface according to the second embodiment of the present invention. Referring now to FIG. 14, which is a single rate coding payload encapsulation method corresponding to FIG. 13. There are from bottom to top: an MAC or PPP protocol layer, an IP layer, an UDP layer, an RTP layer and a Payload layer. The Payload layer may include data of HR, FR or EFR coding method specifically.

(2) Multiple Rate Coding/Decoding

Figure 15:
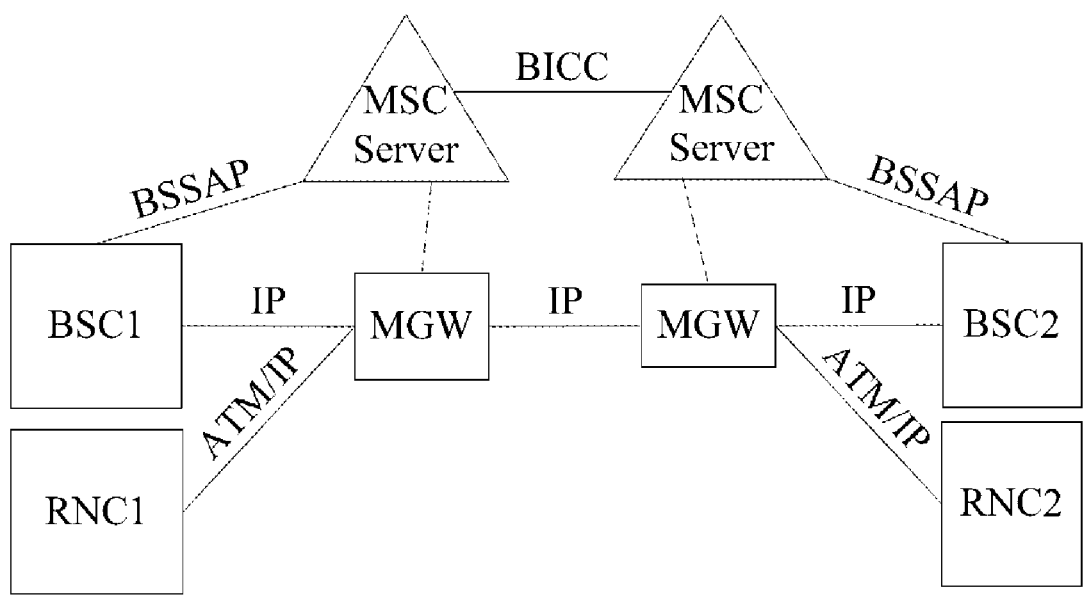
FIG. 15 is a diagram illustrating a networking structure of interworking 2 G and 3 G according to the second embodiment of the present invention.
Figure 16:
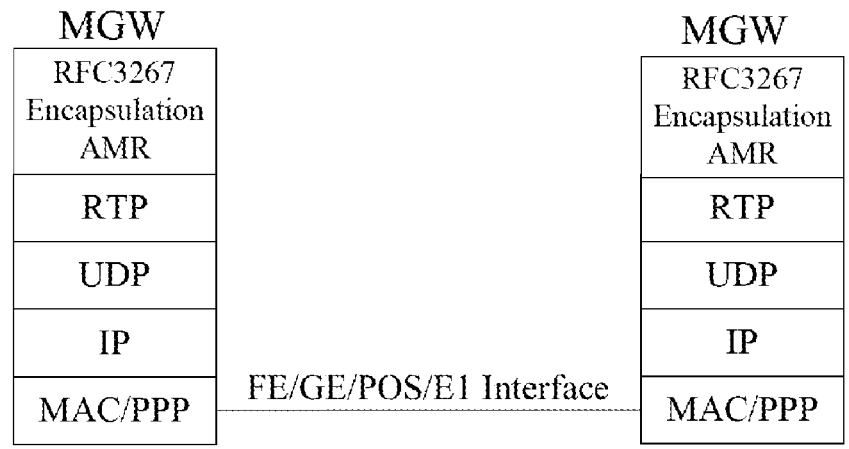
FIG. 16 is a diagram illustrating second architecture of the user plane protocol stack at the Nb interface according to the second embodiment of the present invention.

FIG. 15 is a diagram illustrating a networking structure of interworking 2 G and 3 G according to the second embodiment of the present invention. FIG. 16 is the second diagram illustrating the architecture of the user plane protocol stack at the Nb interface according to the second embodiment of the present invention. Referring now to FIG. 15, which shows also a 2 G to 2 G call between BSC1 and BSC2. When the AMR coding/decoding is adopted, the corresponding encapsulation format is the encapsulation method specified by the RFC3267 shown in FIG. 16 rather than the UP encapsulation format.

Figure 17:
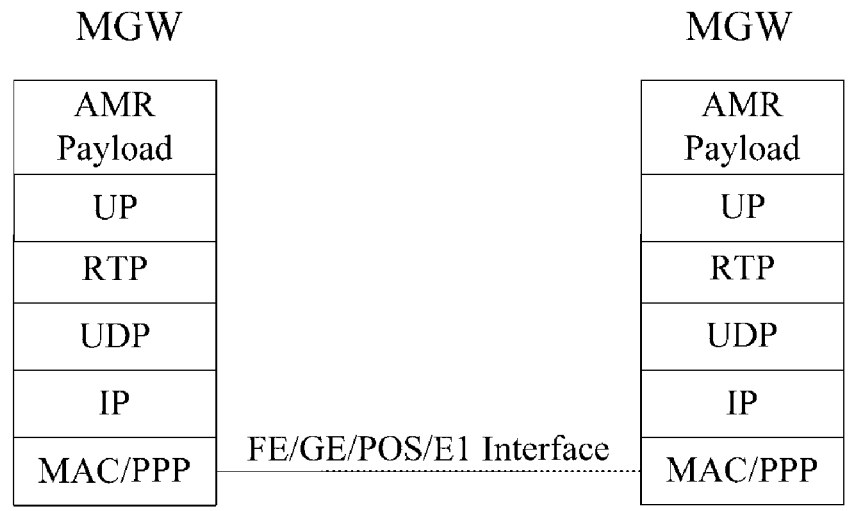
FIG. 17 is a diagram illustrating third architecture of the user plane protocol stack at the Nb interface according to the second embodiment of the present invention.

The call between BSC1 and RNC1 and the call between RNC2 and BSC2 in FIG. 15 are 2 G to 3 G calls. For a 2 G to 3 G call, in the case that AMR coding/decoding is used, the corresponding UP encapsulation method is shown in FIG. 17. FIG. 17 is the third diagram illustrating the architecture of the user plane protocol stack at the Nb interface according to the second embodiment of the present invention. Different from FIG. 16, the AMR Payload in FIG. 17 is the payload of AMR. When the subscriber of 2 G is the calling party, the UP direction at the Nb interface close to 2 G side is CN/Outgoing (outgoing direction of the core network). When the subscriber of 2 G is the called party, the UP direction at the Nb interface close to 2 G side is CN/Incoming (incoming direction of the core network). That is, the MGW on the 2 G side is required to accomplish the conversion from the AMR encapsulation method without UP (A interface) to the AMR encapsulation method with UP.

After the A interface becomes IP-based, if the inter-office Nb interface uses the AMR mode with UP, the bearer information at the Nb interface for negotiation at the Nb interface with the IPBCP is as follows:

c=IN IP4 1 92.168.153.21;
m=audio 764 RTP/AVP 96:
a=ptime:20;
a=rtpmap:96 VND.3GPP.IUFP/16000.

After the A interface becomes IP-based, if the Nb interface does not use the AMR mode with UP, the IPBCP negotiation may be subject to but not limited to the following extensions respectively according to coding methods and data service types:

(1) For a 2 G to 2 G call, if the inter-office Nb interface uses AMR without UP of RFC3267 method, the bearer information negotiated with the IPBCP is:

c=IN IP4 192.168.153.21;
m=audio 764 RTP/AVP 96;
a=ptime:20;
a=rtpmap:96 AMR/8000/1;

(2) If RF coding is used between offices, with its PT being a static PT, the bearer information negotiated with the IPBCP is:
c=IN IP4 192.168.153.21;
m=audio 764 RTP/AVP 3;
a=ptime:20;

(3) If EFR coding is used between offices, the PT is a dynamic PT and the bearer information negotiated with the IPBCP is:
c=IN IP4 192.168.153.21;
m=audio 764 RTP/AVP 97;
a=ptime:20;
a=rtpmap:96 GSM-EFR 8000;

(4) If HR coding is used between offices, the PT is a dynamic PT and the bearer information negotiated with the IPBCP is:
c=IN IP4 192.168.153.21;
m=audio 764 RTP/AVP 97;
a=ptime:20;
a=rtpmap:96 GSM-HR 8000;

(5) For an inter-office data service with UP of 5 ms, the bearer information negotiated with the IPBCP is:
c=IN IP4 192.168.153.21;
m=audio 764 RTP/AVP 96:
a=ptime:5;
a=rtpmap:96 VND.3GPP.IUFP/16000;

(6) For an inter-office G.711 data service of 20 ms, the bearer information negotiated with the IPBCP is:
c=IN IP4 192.168.153.21;
m=audio 764 RTP/AVP 0;
a=ptime:20;
or:
c=IN IP4 192.168.153.21;
m=audio 764 RTP/AVP 8;
a=ptime:20.

It should be noted that the specific IP address and the port number information in the SDP information above are only examples and may vary in practical applications. If the load type PT information of the RTP is dynamic PT in range of 96~127, it may vary similarly in practical applications.

In embodiments of the present invention, the data encapsulation format at the Nb interface may specifically be the following. For 2 G to 2 G data services, 20 ms packaging is used and the mode of RFC2198 standard is used for redundancy. For 2 G to 3 G data services, the G.711 encapsulation method with UP of 5 ms is used.

Embodiment 3

Figure 18:
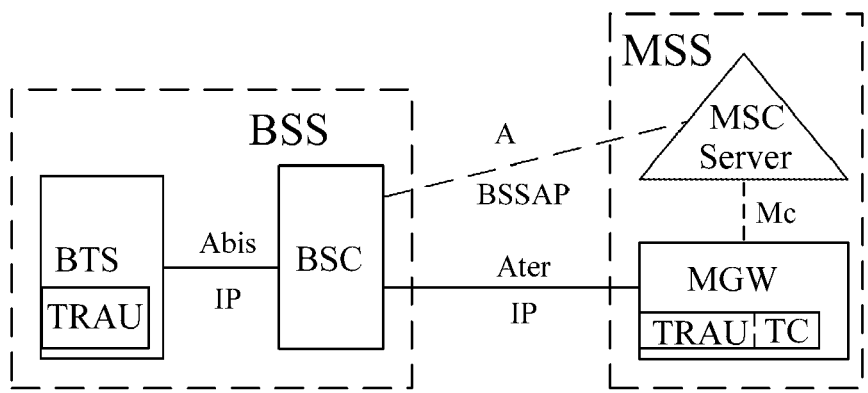
FIG. 18 is a diagram illustrating the system structure of the GSM network with an IP-based Ater interface according to the third embodiment of the present invention.

FIG. 18 is a diagram illustrating the system structure for the implementation of the IP-based Ater interface in the GSM network according to the third embodiment of the present invention. FIG. 18 is different from FIG. 11 in that, the TRAU frames transmitted by the system shown in FIG. 18 are terminated at the MGW side. In other words, the interface between the BSC and the MGW corresponds to the Ater interface in the original GSM system.

Since TRAU frames are terminated at the MGW side, the interface between the BSC and the MGW is an Ater interface. And the A interface in the original GSM system has shrunk into inside the MGW. Sigtran bearer is used for the A interface signaling. IP bearer mode is used for the Ater interface signaling. Signaling between the BSC and the MSC server may be communicated directly via IP or may be forwarded via IP by the MGW. There are two ways for the MSC server to control the establishment of the circuit of the IP bearer plane of the Ater interface:

(1) The MSC server does not control the establishment of the circuit of the IP bearer plane of the Ater interface. With the in-band signaling mode of the bearer plane, the MGW and the BSC negotiate to establish an Ater interface channel via TRAU signaling. The MGW acquires the voice code type of the BSC by resolving the TRAU frames of the Ater interface and compare it with the code type of core network. If the code types are not consistent with each other, a TC is inserted for conversion of voice coding.

(2) The MSC server controls the establishment of the circuit of the IP bearer plane of the Ater interface. The resource management function of IP voice bearer mode and information related to the IP bearer of the BSSAP protocol are extended and the Ater interface is simulated as an A interface in the original system. The establishment of the circuit of the IP bearer plane of the Ater interface is similar to that of FIG. 9. The difference lies in that, after the MGW and the BSC establish IP bearer, the MSC server acquires the code type selected by the BSC and then distributes it to the end point of the MGW corresponding to the BSC side, hence ensuring that the code type on the BSC side is consistent with the code type of the end point of the MGW corresponding to the BSC. Then the MGW compares code types on both sides for consistence. If they are consistent, TrFO of voice channel is realized. Otherwise, a TC is inserted for transcoding.

Compared with FIG. 10, the fifth TRAU layer is added in the protocol stack of the A/Ater interface bearer plane of the system shown in FIG. 18.

As can be seen from the above-described embodiments, neither TRAU frame processing nor conversion of voice coding is required at the BSC, only the transparent transmission of TRAU frames is performed.

In the first, second and third embodiments described above, the transmitted TRAU frames are terminated by the BSC or the MGW. Further, TRAU frames may also be canceled throughout the network, that is, IP-based voice frames are output directly at the BTS.

The specific implementations will be described below with the fourth and fifth embodiments respectively.

Embodiment 4

Figure 19:
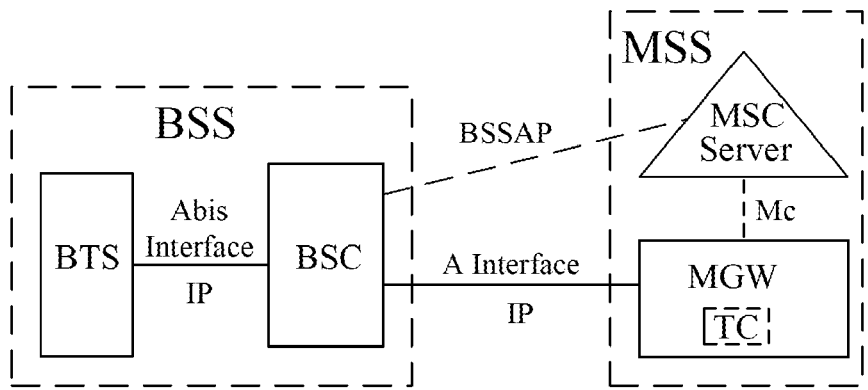
FIG. 19 is a diagram illustrating the system stricture of the IP-based GSM network according to the fourth embodiment of the present invention.

FIG. 19 is a diagram illustrating the structure of the IP-based GSM network according to the fourth embodiment of the present invention. As shown in FIG. 19, the establishment of IP bearer connection between the BSC and the MGW is similar to that of FIG. 9. The BSSAP protocol needs to be extended as necessary for transmitting IP bearer information such as the IP address and the port number. If the code type on the MGW side of the calling side BSC is inconsistent with that on the called side of the called side BSC, a TC is inserted on the MGW side for transcoding. After the IP bearer connection is established, the BTS outputs IP-based voice frames, such as IP/UDP/RTP/VOICE messages and the BSC receives the voice frames to forward them to the MGW.

In the above-described embodiment, since bearer mode conversion is not required, the time delay of transmission is decreased and the quality of voice transmission is enhanced.

Further, in the above-described embodiment, after the IP bearer connection is established, the BSC may alternatively not participate in the forwarding of voice frames, and voice frames are communicated directly between the BTS and the MGW, which further decreases the time delay caused by the voice frames forwarding at the BSC and saves the processing capacity of the BSC, which is described specifically in the fifth embodiment.

Embodiment 5

Figure 20:
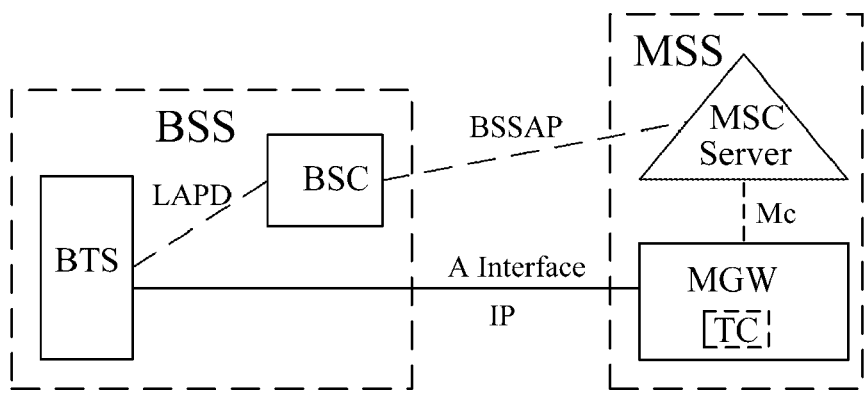
FIG. 20 is a diagram illustrating the system structure of the IP-based GSM network according to the fifth embodiment of the present invention.

FIG. 20 is a diagram illustrating the structure of the IP-based GSM network according to the fifth embodiment of the present invention. The BSC communicates signaling with the BTS and the MSC server via a signaling channel such as Link Access Procedure on the D channel (LAPD) and a BSSAP, respectively, and does not participate in the forwarding of voice frames on bearer plane. In the present embodiment, in order to establish the bearer connection between the BTS and the MGW, the BSSAP protocol and the LAPD protocol need to be extended with respect to IP bearer information. The establishment of the bearer connection is similar to that of FIG. 9. The difference is as follows. The BSC receives the assignment message and acquires the IP bearer information and then transmits it to the BTS via LAPD signaling. The BTS acquires the IP address and the port number assigned for the call by the MGW wireless side and assigns the IP address and the port number of its own side BTS for the call. The BTS reports the IP bearer information (the IP address and the port number) assigned for the call to the BSC. The BSC then transmits the IP address and the port number assigned by the BTS carried in the assignment response message to the MSC server. The MSC server then indicates them to the MGW. The BTS and the MGW may establish the bearer if both of them know the IP address and the port number of each other. The code type used by the BTS, i.e. the selected code type carried in the assignment response message by the BSC, is completely controlled by the BSC. The MSC server distributes the BTS code type selected by the wireless side to the MGW to ensure that the code type of the wireless side end point of the MGW is always consistent with the code type used by the BTS. The MSC server conducts code type negotiation for the full path of the voice channel. If the negotiation succeeds, TrFO is realized. If the negotiation fails, the MGW on the calling side or the MGW on the called side is selected into which a TC for code type conversion is inserted.

In practical applications, the MS may also switch among different BTSs. The BSC transmits notifications to the MSC server to notify the MSC server of the new IP addresses and the port numbers of the BTSs. The MSC server receives the notifications, distributes notifications for changing the bearer of the MGW and accomplishes bearer switching.

The sixth and seventh embodiments are set forth below to explain the signaling control procedure of the present invention.

Embodiment 6

Figure 21:
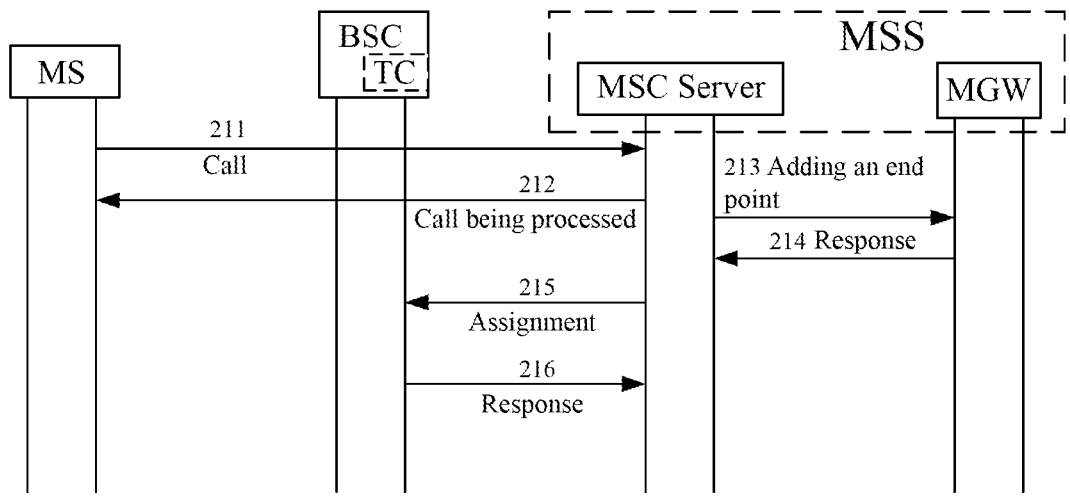
FIG. 21 is a diagram illustrating the procedure of signaling processing with the TC arranged at the BSC side according to an embodiment of the present invention.

FIG. 21 is a diagram illustrating the signaling procedure of arranging a TC at the BSC side according to an embodiment of the present invention. In the present embodiment, the TC is disposed at the BSC, the BSC converts voice coding, and the IP bearer connection is established at the calling party. Referring to FIG. 21, the procedure includes the following steps.

In step 211, the MS initiates a call that is forwarded to the MSC server via the BTS and the BSC.

In step 212, the MSC server returns a message to the MS, indicating that the call request is being processed.

In step 213, the MSC server transmits a message to the MGW for adding a wireless side end point.

In steps 211~213, the call request message received by the MSC server contains information about the code types supported by the MS itself. An intersection between the code types and code types supported by the MSC server is found to form a priority list of the code type and a wireless side end point is added at the MGW via the Mc interface.

In step 214, the MGW receives the message for adding a wireless side end point and returns a response message.

In this step, the MGW receives the message for adding a wireless side end point, assigns an IP address and a port number for the call, and the response message includes the IP address and the port number assigned for the call by the MGW.

In step 215, the MSC server receives the response message and transmits an assignment message to the BSC. The message contains the IP address and the port number assigned for the call by the MGW and the MSC server priority list of the code type.

In step 216, the BSC receives the assignment message, returns an assignment response message containing the assigned IP bearer information and the selected code type.

In this step, the BSC receives the response message, acquires the IP address and the port number assigned by the MGW for the call, assigns the IP address and the port number of its own side for the call and initiates the establishment of the IP bearer at the same time. Selecting a code type by the BSC to be used by itself may be selecting a code type according to the order of priority in the priority list of the code type provided by the MSC server or according to its own policy. The BSC returns an assignment response message to the MSC server which contains the code type selected by the BSC and the IP address and the port number assigned by the BSC for the call. The MSC server initiates code type negotiation for the full voice channel call via the following steps.

The BSC selects a code type and transmits the code type information to the MSC server. The MSC server passes backwardly the code type selected by the BSC and places the code type selected by the BSC on the calling side at the first position of the priority list of the code type for distributing to the BSC on the called side. If the BSC on the called side supports and selects the code type selected by the BSC on the calling side, a full path TrFO voice channel may be realized. Otherwise, the code type selected by the BSC on the called side is inconsistent with the priority order in the MSC server priority list of the code type, code type conversion needs to be performed at the BSC on the called side. For example, the calling party assigns FR/EFR, and the BSC on the calling side selects FR. The MSC server on the calling side passes the FR backwardly. The called MS supports HR/FR/EFR. The MSC server on the called side distributes FR/HR/EFR to the BSC on the called side. If the BSC on the called side selects FR, then the code type selected by the BSC on the calling side is consistent with the preferred code type recommended by the MSC server on the calling side, and a full path TrFO voice channel may be realized without inserting any TC for code type conversion. If the BSC on the called side selects HR which is fed back to the MSC server on the called side via the assignment response message. The MSC server on the called side finds out that TrFO cannot be realized in its own segment through analysis and judgment and distributes a code type modify message to the BSC on the called side to instruct the BSC on the called side to implement code type conversion between FR and HR.

In practical applications, after the IP bearer connection is established, if the BSC needs to change the selected code type due to reasons such as wireless network capacity, the BSC changes the selected code type by itself and reports it to the MSC server, and a code type re-negotiation is initiated. The process is similar to the code type negotiation during the call establishment. The difference is that, the case in which the MSC server on the called side passes preferred code type to the MSC server on the calling side may occur. After the code type of the BSC on one side changes, the TrFO of the full voice channel may be broken. However, it is possible that the original non-TrFO call becomes a TrFO call through re-negotiation.

Embodiment 7

Figure 22:
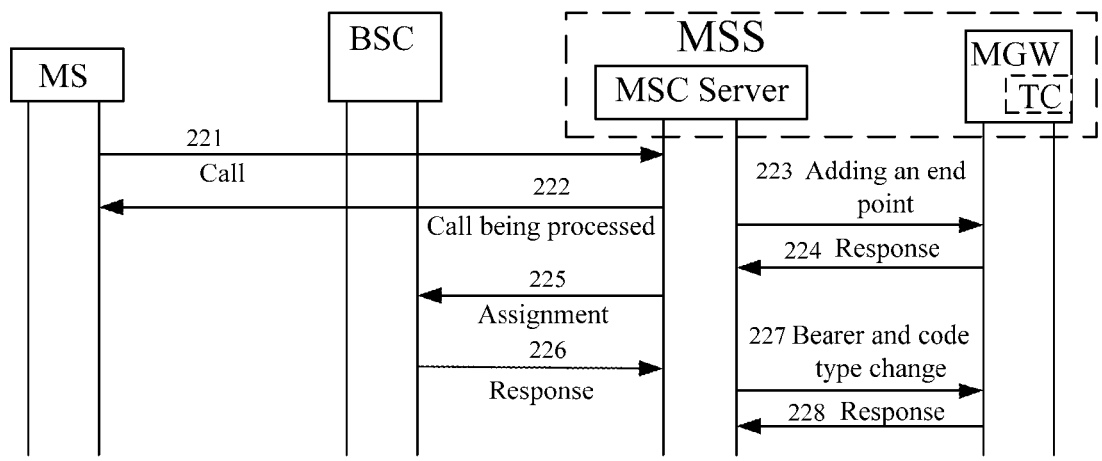
FIG. 22 is a diagram illustrating the procedure of signaling processing with the TC arranged at the MGW side according to an embodiment of the present invention.

FIG. 22 is a diagram illustrating the signaling procedure of arranging a TC at the MGW side according to an embodiment of the present invention. Referring to FIG. 22, the procedure includes the following steps.

In step 221, the MS initiates a call that is forwarded to the MSC server via the BTS and the BSC.

In step 222, the MSC server returns a message to the MS, indicating that the call request is being processed.

In step 223, the MSC server transmits a message to the MGW for adding a wireless side end point.

In steps 221~223, the call request message received by the MSC server contains information about the code types supported by the MS itself, an intersection between the code types and code types supported by the MSC server is found to form a priority list of the code type and a wireless side end point is added at the MGW via the Mc interface.

In step 224, the MGW receives the message for adding a wireless side end point and returns a response message.

In this step, the MGW receives the message for adding a wireless side end point, assigns an IP address and a port number for the call, and the response message includes the IP address and the port number assigned by the MGW for the call.

In step 225, the MSC server receives the response message and transmits an assignment message to the BSC which contains the IP address and the port number assigned by the MGW for the call and the MSC server priority list of the code type.

In step 226, the BSC receives the assignment message and returns an assignment response message.

In this step, the BSC receives the assignment message, acquires from the assignment message the IP address and the port number assigned by the MGW for the call, assigns the IP address and the port number of its own party for the call and establishes the IP bearer. Selecting a code type by the BSC used by itself may be selecting a code type according to the order of priority in the priority list of the code type provided by the MSC server or according to its own policy. An assignment response message containing information about the code type selected by the BSC and the IP address and the port number assigned for the call by the BSC is transmitted to the MSC server.

In step 227, the MSC server receives the assignment response message, acquires the information on the IP address and the port number assigned by the BSC for the call, generates a bearer and code type modify message and transmits it to the wireless side end point of the MGW.

In step 228, the wireless side end point of the MGW receives the IP bearer information and the code type modify message, performs corresponding processing and returns a response message.

In this step, once the MGW obtains the wireless side IP bearer information specified by the BSC, the MGW may initiate the establishment of bearer to the BSC/BTS on the wireless side. The wireless side end point of the MGW receives the code type modify message, modifies the code type of the end point according to the code type instructed in the message and returns a response message to the MSC server.

The processing of signaling on the called side is similar to that on the calling side. The code type of the wireless network side end point of the BSC is to be ensured consistent with the code type of the BSC side end point of the MGW by the code type modify message. The MGW is only required to compare the code types of the Nb interface and the A/Ater interface for determining their consistence. If the code types are inconsistent, code type converting TCs are inserted; otherwise, no code type converting TC is inserted and a full path or half path TrFO voice channel is realized.

After the IP bearer connection is established, the BSC initiates a code type change request when code types are required to be changed or switched. After changing the code types of end points corresponding to all MGWs, the MSC server transmits code type change response message to the BSC. The BSC changes code types.

In the embodiments of the present invention, by using IP transmission between the BSS and the MSS, the object of saving transmission resources may be achieved with the packet multiplexing feature of IP. In practical applications, the transmission efficiency may be further increased with relevant techniques such as Compressed Real-Time Protocol (CROP), Real-Time Protocol Multiplexing (RTP Multiplex), Point to Point Protocol Multiplex (PPPMUX) and IP header multiplex.

The objects, technical solutions and advantages of the present invention are described further in details in connection with the above preferred embodiments. It is understood that exemplary embodiments provided above are only preferred embodiments of the present invention and is not intended to limit the scope of the present invention. Any modifications, equivalent replacements and improvements within the principle of the present invention should be contained in the scope of the present invention.

What is claimed is:

1. A method for establishing a bearer for a GSM network, comprising:
    receiving, by a Mobile Switching Center (MSC) server, from a mobile station a call request message containing information about a code type supported by the mobile station;
    establishing, by the MSC server, a code type priority list according to the call request message, and transmitting a message for adding a wireless side end point to a Media Gateway (MGW);
    receiving, by the MSC server, a response message comprising a first IP address and a first port number assigned by the MGW;
    transmitting, by the MSC server, an assignment message containing the first IP address, the first port number and the code type priority list to a Base Station Controller (BSC);
    receiving, by the MSC, from the BSC an assignment response message containing a second IP address and a second port number assigned by the BSC, and a code type selected by the BSC according to a priority order in the code type priority list; and
    transmitting, by the MSC server, the second IP address and the second port number to the MGW.

2. The method of claim 1, further comprising:
    negotiating and establishing, by the MGW, with the BSC, an Ater interface channel between the BSC and the MGW through coding and rate adaption unit signaling in an in-band signaling mode on a bearer plane;

acquiring the IP address and the port number assigned for the call by the MGW and assigning its own IP address and port number for the call; and acquiring, by the MGW, the IP address and the port number assigned for the call by the BSC through the Ater interface channel.

3. The method of claim 1, further comprising:

modifying, by the MGW, a code type of the wireless side end point according to the code type selected by the BSC, and establishing an IP bearer with the BSC.

4. The method of claim 3, further comprises:

placing, by the MSC server, the code type selected by the BSC at the first position in the code type priority list and then transmitting the code type priority list to another MSC server on a called side which sends the code type priority list to a BSC on the called side.

5. A base station control equipment, comprising:

a receiving unit configured to receive an assignment message from a Mobile Switching Center (MSC) server, wherein the assignment message contains a first IP address and a first port number assigned by a Media Gateway (MGW) and a code type priority list which is established by the MSC server according to a call request message containing information about a code type supported by a mobile station;

a processing unit configured to receive the assignment message from the receiving unit, acquire the first IP address and the first port number, assign a second IP address and a second port number; and a transmitting unit configured to receive an assignment response message containing the second IP address, the second port number and a code type selected the BSC according to a priority order in the code type priority list and transmit the assignment response message to the MSC server.

6. The base station control equipment of claim 5, wherein the receiving unit is further configured to receive wireless side data and the processing unit comprises:

an coding and rate adaption unit terminating module, configured to remove a coding and rate adaption unit encapsulation from the received wireless side data to acquire voice compression coded payload data; and a data encapsulating module, configured to encapsulate the voice compression coded payload data obtained by the coding and rate adaption unit terminating module in an IP packet, and output the IP packet to the transmitting unit.

7. The base station control equipment of claim 6, wherein the processing unit further comprises:

a code converting module, configured to convert a code type according to a code type modify message distributed by the MSC server.

8. A Mobile Switching Center (MSC) Server, comprising:

a receiving unit configured to receive a call request message containing a code type supported by a mobile station itself from the mobile station, a response message containing a first IP address and a first port number assigned for a call returned by a Media Gateway (MGW) and an assignment response message returned by a base station controller (BSC) containing a second IP address and a second port number for the call;

a processing unit is configured to establish a code type priority list according to the call request message; generate an assignment message containing the first IP address, the first port number and the code type priority list; conduct a code type negotiation according to the received assignment response message; and a transmitting unit configured to receive a message for adding a wireless side end point from the processing unit and transmit the message for adding the wireless side end point to the MGW; transmit the second IP address and the second port number to the MGW; and transmit the assignment message to the BSC.

* * * * *